(12) United States Patent
Sneyders et al.

(10) Patent No.: US 11,100,648 B2
(45) Date of Patent: Aug. 24, 2021

(54) DETECTING CROP RELATED ROW FROM IMAGE

(71) Applicant: Raven Industries, Inc., Sioux Falls, SD (US)

(72) Inventors: Yuri Sneyders, Zemst (BE); John D. Preheim, Beresford, SD (US); Jeffrey Allen Van Roekel, Sioux Falls, SD (US)

(73) Assignee: Raven Industries, Inc., Sioux Falls, SD (US)

( * ) Notice: Subject to any disclaimer, the term of this patent is extended or adjusted under 35 U.S.C. 154(b) by 0 days.

(21) Appl. No.: 16/509,127

(22) Filed: Jul. 11, 2019

(65) Prior Publication Data

US 2020/0020103 A1    Jan. 16, 2020

Related U.S. Application Data

(60) Provisional application No. 62/696,719, filed on Jul. 11, 2018.

(51) Int. Cl.
*G06T 7/12* (2017.01)
*G06T 7/73* (2017.01)
*A01B 69/04* (2006.01)

(52) U.S. Cl.
CPC ............... *G06T 7/12* (2017.01); *G06T 7/73* (2017.01); *A01B 69/008* (2013.01); *G06T 2207/30188* (2013.01)

(58) Field of Classification Search
CPC ... G06T 7/12; G06T 7/73; G06T 2207/30188; A01B 69/008
See application file for complete search history.

(56) References Cited

U.S. PATENT DOCUMENTS

| | | | |
|---|---|---|---|
| 7,570,783 B2 | 8/2009 | Wei et al. | |
| 8,019,513 B2 | 9/2011 | Jochem et al. | |
| 9,064,151 B2 | 6/2015 | Shamir et al. | |
| 2008/0065287 A1* | 3/2008 | Han | G01S 19/48 701/28 |
| 2013/0235183 A1* | 9/2013 | Redden | A01G 7/00 348/89 |

(Continued)

FOREIGN PATENT DOCUMENTS

| | | |
|---|---|---|
| WO | WO-2013/110668 A1 | 8/2013 |
| WO | WO-2017/183034 A1 | 10/2017 |
| WO | WO-2020/014519 A1 | 1/2020 |

OTHER PUBLICATIONS

Hague et al, "A bandpass filter-based approach to crop row location and tracking", 2001, Mechatronics 11 (2001), pp. 1-12 (12 pages) (Year: 2001).*

(Continued)

*Primary Examiner* — David F Dunphy
(74) *Attorney, Agent, or Firm* — Schwegman Lundberg & Woessner, P.A.

(57) ABSTRACT

System and techniques for detecting a crop related row from an image are described herein. An image that includes several rows where the several rows including crop rows and furrows can be obtained. The image can be segmented to produce a set of image segments. A filter can be shifted across respective segments of the set of image segments to get a set of positions. A line can be fit members of the set of positions, the line representing a crop row or furrow.

20 Claims, 7 Drawing Sheets

(56) References Cited

U.S. PATENT DOCUMENTS

2014/0254861 A1* 9/2014 Nelson, Jr. ........... G05D 1/0246
382/100

OTHER PUBLICATIONS

"International Application Serial No. PCT/US2019/041459, International Search Report dated Oct. 16, 2019", 2 pgs.
"International Application Serial No. PCT/US2019/041459, Written Opinion dated Oct. 16, 2019", 5 pgs.
Behfar, Hossein, et al., "Vision-Based Row Detection Algorithms Evaluation for Weeding Cultivator Guidance in Lentil", *Modern Applied Science*; vol. 8, No. 5, (2014), 224-232.

* cited by examiner

DETECTING CROP RELATED ROW FROM IMAGE

TECHNICAL FIELD

Embodiments described herein generally relate to computer vision systems for vehicles and more specifically to detecting a crop related row from an image.

BACKGROUND

Many crops that are farmed are row crops. Row crops are arranged into rows that are generally equally spaced parallel rows in a field separated by furrows. Tending row crops generally involves passing agricultural equipment (AEQ) (e.g., tractors, planters, harvesters, irrigators, fertilizers, etc.) over the field. Generally, the AEQ should follow the rows such that support structures (e.g., wheels, treads, skids, etc.) remain in the furrows so as not to damage the crops. Further, equipment dealing directly with the crops should follow the centerline of the crop rows.

Navigation systems using an external location mechanism have been employed to facilitate automatic navigation of AEQ. These systems include using global position system (GPS) units to locate the position of AEQ with respect to crop rows. Generally, these systems use an initialization operation to determine positions through which the AEQ should pass and then provide information about the current position of AEQ in a field to facilitate navigation. An example initialization operation can include using a GPS unit to record the movement of AEQ as the row crops are planted. This recording can later be used to guide the AEQ for subsequent operations.

Computer vision (CV) can be used to guide AEQ down the crop rows. CV can be superior to external location mechanisms when for example, the external location mechanism is compromised (e.g., has inaccurate or absent positioning) or has not been initialized. A CV navigation system generally involves a sensor, such as a camera, mounted on the AEQ to collect features of the environment. These features can be used to ascertain AEQ position relative to a crop related row (e.g., a crop row or a furrow) positions and provide that information as parameters to a steering controller to control the AEQ.

Often, CV steering systems ascertain two guidance parameters that are provided to the steering controller: track-angle error (TKE) and cross-track distance (XTK). TKE involves the angle between the forward direction of the AEQ and the rows such that, when the AEQ is following the rows the TKE is 0° and when the AEQ is moving parallel to the rows the TKE is 90°. Accordingly, the TKE can be considered the current angle-of-attack for AEQ moving towards a given row. The XTK distance is the distance between the current position of the AEQ and the crop related row. Using TKE and XTK as parameters to the steering module can allow for an effective row guidance system of AEQ using CV. Thus, costs and error can be reduced in performing an initialization operation for GPS based systems, or for automatic navigation of AEQ when GPS, or other navigation systems, are unavailable.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

Figure 1:
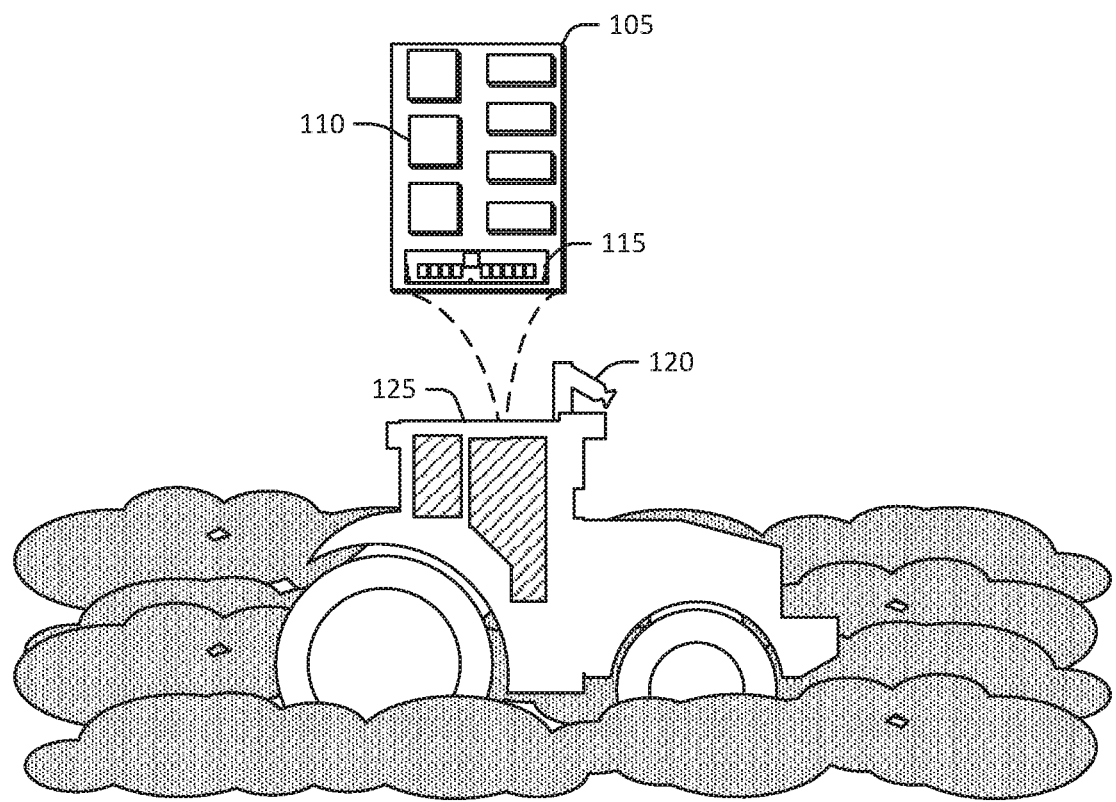
FIG. 1 is an example of an environment including a system for detecting a crop related row from an image, according to an embodiment.

Finding crop related rows is an important aspect in determining TKE and XTK in CV systems. Although several techniques for line fitting can be used—such as Gabor filters, Hough transforms, edge detection, etc.—they often suffer from significant processing or storage requirements. Generally, these techniques use significant memory to store images, and significant processing to find the lines. This situation results in increased processing latencies, which can impact real-time driving performance for AEQs, or expensive equipment that often consumes significant power.

To address the problems with current CV based AEQ navigation systems, a technique convolving filters that are associated with, or modeled after, a crop row across image segments can be used. The image is segmented such that several crop related rows are represented in each segment. For example, a raster line can be used as an image segment. Based on a variety of factors (e.g., known crop spacing, camera perspective parameters, etc.) a filter is selected and compared to the image segment. The position of the filter is shifted until extremum are found. Here, the extremum result when a top or bottom of a wave (or similar structure of the filter) correlates to the middle of a crop related row. Thus, if a difference image is used where crop pixels have a value of one and furrow pixels have a value of zero, multiplying the filter (e.g., constituent elements of the filter) to the pixel values will result in a position whereby the tops (e.g., peaks) or bottoms (e.g., troughs) of the filter most closely align to the crop pixels. In an example, the maxima (e.g., best fit) and minima (e.g., worst fit) positions can be combined, resulting in additional noise reduction.

A filter can include a periodic function (e.g., a sine or triangular function), quasiperiodic function, almost periodic function, or any other type of function, such as a function that includes one or more cycles of a predictable pattern. In an example, a filter can be selected based on ground coordinates (e.g., physical space coordinates) of crop rows, such as to cause peaks or troughs of the selected filter to match or align with the crops and furrows of one or more crop row. Such a filter can be periodic in the ground or physical space coordinate plane due to fixed crop row spacing. Such periodic filter can be transformed, such as by a homographic transformation, to the image or pixel coordinate plate to perform the filtering operations described herein. Such transformation can cause the transformed filter to lose periodicity, such as to cause the filter to become quasiperiodic or almost periodic, due to compression at the edges (e.g., the left and right edges) of an image relative to the center of the images. In another example, a filter can be selected based on image or pixel space coordinates, such as to match or align with a distribution of crop rows in an image. In particular examples, a filter (e.g., a periodic filter such as sign function) can be selected to approximate the semi-periodic or near periodic distribution of crop rows in an image.

The terms "period" or "cycle", as used herein, can refer to a period or cycle of a periodic, quasiperiodic, almost periodic filter. The terms "period" or "cycle" can also refer to a predictable or repetitive portion of any filter or function used for the filtering or convolution techniques described herein.

Once the extremum is found, the position for the extremum is used to determine other crop row positions across other segments of the images. These positions can then be related by a line-fitting technique—such as a linear regression, random sample consensus (RANSAC), etc.—to find centerline representations for the crop related rows. These lines can then be used to find the TKE or XTK. At some point, the pixel values are converted into real-world measurements (e.g., meters) via a homography, though the conversion can occur in different parts of the pipeline.

The image segments can be processed independently, enabling effective use of parallel processing hardware such as modern graphics processing units (GPUs), or an array of application specific integrated circuits (ASICs) or field programmable gate arrays (FPGAs). This can reduce hardware costs, reduce power consumption, and decreasing latency. These benefits are enhanced by the relatively efficient comparisons used to match certain filters (e.g., filters based on periodic functions) to the targeted crop related rows, again enabling simpler and faster hardware than available to other techniques. Additional details and examples are described below, FIG. 1 is an example of an environment including a system 105 for detecting a crop related row from an image, according to an embodiment. The environment includes an AEQ 125, such as a tractor, truck, drone, or other vehicle situated proximate to crop related rows. The AEQ 125 includes a sensor 120, such as a camera, and the system 105. The sensor 120 operates by receiving light, which can be in the visible spectrum, ultraviolet, or infrared, or combinations thereof. In an example, the sensor 120 is only a light sensor, and is not a pattern-based or timing-based depth sensor, for example. Accordingly, the output of the sensor 120 is an image where elements (e.g., pixels, regions, etc.) represent wavelengths (e.g., colors) intensities (e.g., luminance) of light.

Figure 2A:
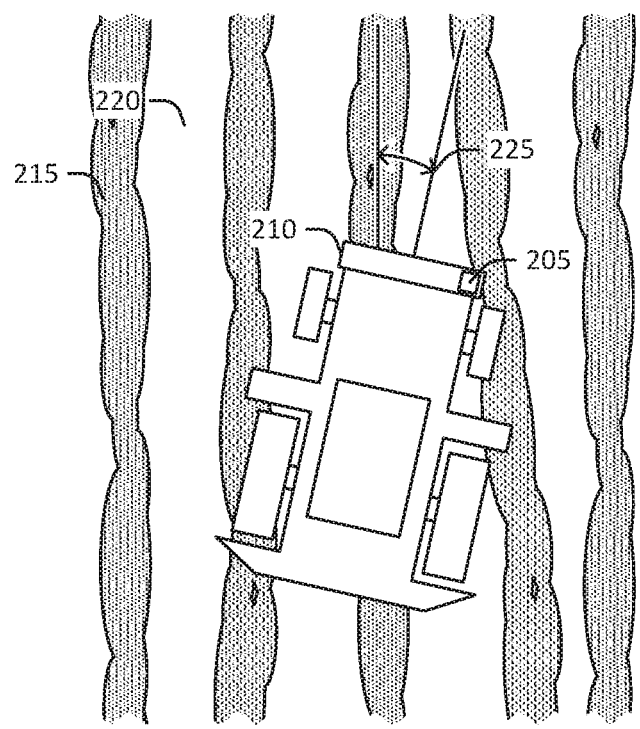
FIGS. 2A-2B illustrate various components and relationships of an AEQ in an operating environment, according to an embodiment.
Figure 2B:
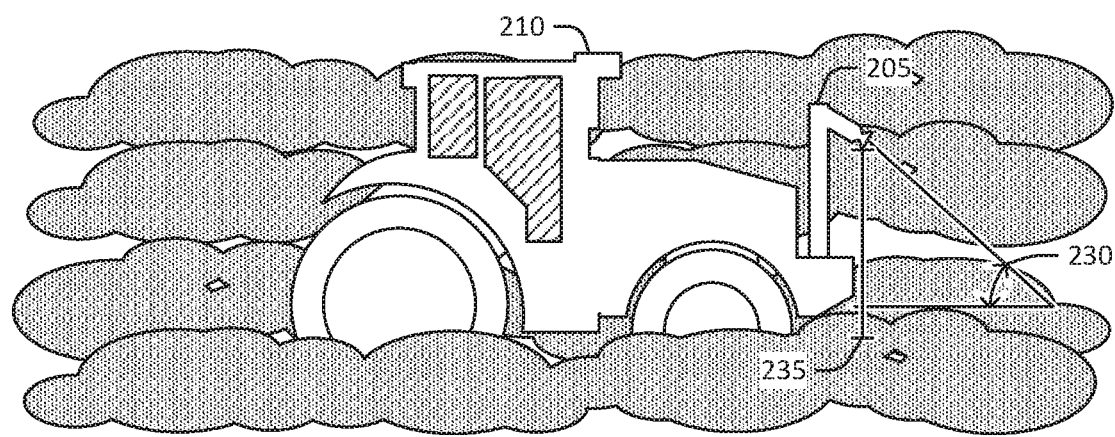

In an example, the sensor 120 is mounted to the AEQ 125 and calibrated for use. Calibration can include such things as providing a mounting height, perspective angle, position on the AEQ 125, etc. The calibration parameters can be used in a homography to translate measurements on the image to the field, for example. These can be used to translate TKE or XTK processed from the image to steering parameters for a steering controller of the AEQ 125. FIGS. 2A and 2B illustrate some additional aspects of the environment.

The system 105 can include processing circuitry 110 and a memory 115 (e.g., computer readable media). The memory 115 is arranged to hold data and instructions for the processing circuitry 110. To support CV navigation for the AEQ 125, the processing circuitry 110 is arranged to obtain an image that includes several rows. Here, obtaining the image can include the processing circuitry 110 retrieving the image from a buffer (e.g., in the memory 115) or receiving the image (e.g., directly from the sensor 120 via direct memory access (DMA) or the like). (e.g., retrieved or received). Here, the several rows are crop related rows that include both crop rows and furrows. As illustrated, the rows are generally arranged in the image such that they extend from the bottom of the image to the top (e.g., in a columnar orientation) with respect to the sensor 120. Although a perpendicular arranged of crop related rows (e.g., the rows extend from a left side to a right side of the image) are possible (e.g., as the AEQ 125 approaches a field or turns at a row end), the techniques described below can still be applied via a translation of the image (e.g., a ninety-degree turn) if at least some part of the multiple rows are distinguishable in the image.

In an example, the image is an intensity image. An intensity image has a single value representation for any point in the image. Thus, in an example, the intensity image is implemented as a grayscale image. In an example, a crop row is lighter (e.g., has a greater value) than a furrow. Generally, a standard grayscale image uses luminance as the intensity measured at any given pixel. However, different manipulations to a color image can be performed to, for example, increase the contrast between different types of crop related rows. Thus, for example, if a crop row is a first color and a furrow is a second color, then the first color can be scaled to be the most intense and the second color scaled to be the least intense. In an example, the intensity image is binary, with positions being either one value (e.g., a one) or another value (e.g., a zero). Such an image can be easier to process and store, and can be achieved in several ways, including threshold clustering.

Figure 3A:
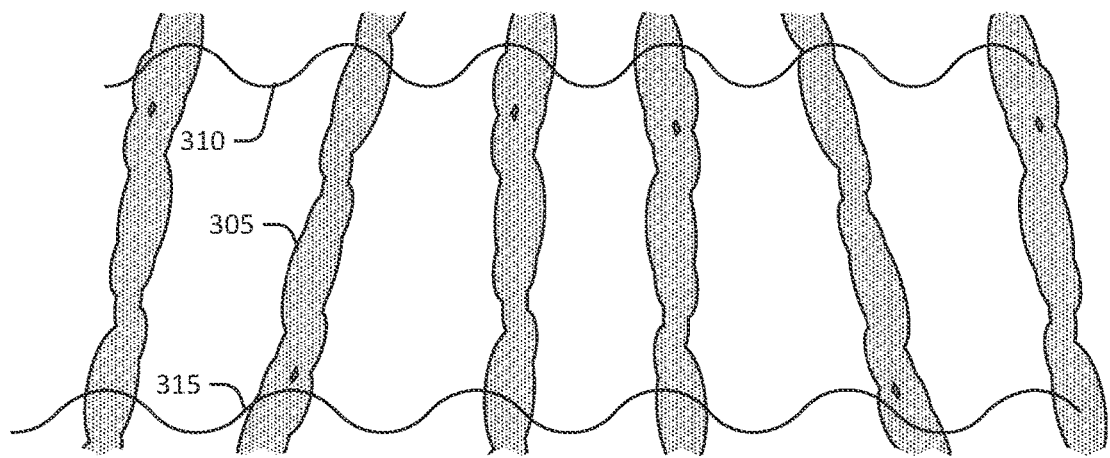
FIGS. 3A-3B illustrate fitting a filter to crop rows, according to an embodiment.
Figure 3B:
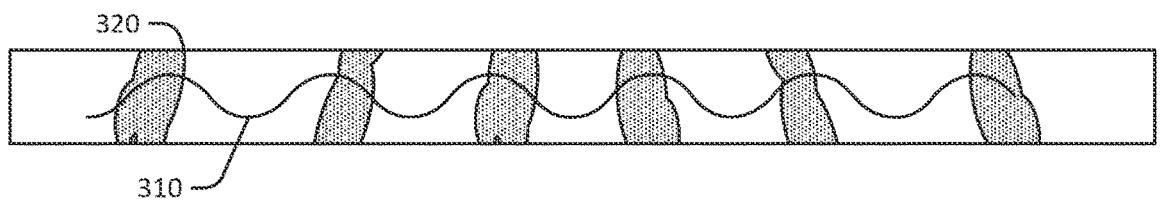
Figure 3B:
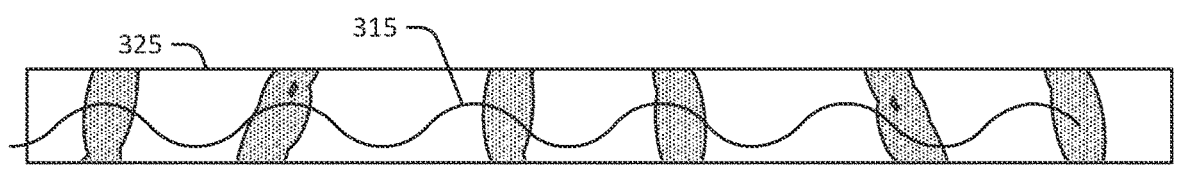

The processing circuitry 110 is arranged to segment the image to produce a set of image segments. In an example, segments in the set of image segments are scanlines (e.g., raster rows) of the image. Other example segments can include partial scanlines, multiple scanlines, a sampling of scanlines (e.g., not all scanlines), etc. Generally, each segment will include multiple crop related rows of one type (e.g., two or more furrows). In an example, the segments are sized to fit within a buffer (e.g., a register), such as in the memory 115. Such sizing can, in an example, enable efficient single instruction multiple data (SIMD) processing of the image. FIGS. 3A and 3B illustrate an example segmentation.

The processing circuitry 110 is arranged to shift a filter across respective segments of the set of image segments to get a set of positions. The shifting is an example of a convolution on the image segments. The filter, such as a sine wave, triangular wave, square wave, etc. is compared against the data in the image segment to fit to that data. Here, the set of positions are based on the structure of the filter, such as the tops or bottoms of a sine wave.

In an example, shifting the filter across respective segments includes shifting the filter across several segments in parallel. That is, with respect to calculating the set of positions, the image segments are independent of each other. Thus, each image segment can yield a set of positions without impacting the processing of any other segment. This parallelism can benefit many hardware configurations, such as the SIMD capabilities of GPUS to quickly calculate the positions. The independent nature of these calculations can also be efficiently processed by clusters of processing circuits even if inter-circuit communications have high latencies, such as can occur in several FPGAs or ASICs communicating on a bus, between a co-processor and a processor, or even to other devices connected to the system 105 via a network (e.g., wired or wireless).

In an example, to shift the filter across respective segments, the processing circuitry 110 is arranged to use a first period on a first segment and a second period on a second segment. In an example, the first period and the second period are respectively selected based on a respective position of the first segment and the second segment in the image. These examples address an issue whereby the perspective of the field provided by the sensor 120 results in a tapering of crop related rows as they move away from the sensor 120. Thus, for the same crop type, portions of the crop related rows will appear closer together at the top of the image than they will at the bottom of the image. Here, a different period (e.g., a shorter period) can be used for segments taken at the top of the image than those at the bottom of the image. In an example, the first period and the second period are based on a calibration parameter. In an example, the calibration parameter is a type of crop. Thus, once the type of crop is known, a specific set of periods for the given filter can be used. In an example, the set of periods are arranged in order of the segmentation (e.g., top to bottom). This can speed retrieval of the periods from the memory 115, for example, via a block read or the like. In an example, the calibration parameter is derived from a user selection. Here, the user selects or inputs the crop, a crop row spacing, a center-of crop-to center of furrow distance, etc. at a user interface.

In an example, to shift the filter across respective segments of the set of image segments to get the set of positions, the processing circuitry 110 is arranged to evaluate the filter at a series of positions, starting from a first position, until an end condition. In an example, the end condition is an extremum (e.g., the evaluations continue until an extremum is found). Here, a position corresponding to the extremum is then added to the set of positions. In an example, the extremum is a maximum. In an example, the extremum is a minimum (e.g., worst fit). In an example, the extremum is a maximum (e.g., best fit). For example, the value of any given pixel can be multiplied by the filter, to achieve a first value. The filter can then be shifted by one pixel and multiplied against the pixels of the image segment again. This process is repeated until a resulting value is smaller than a previous value. The previous position is then that which corresponds to the maximum. This shift-multiply-compare technique efficiently operates on several architectures, such as GPUs—where the several shifted filters on a single segment can be processed in parallel and compared at the end of a clock cycle or digital signal processors (DSPs). Also, by locating the position (e.g., centering a wave top on a crop row) via a maximum value across all visible crop rows, for example, the technique is resistant to noise due to row interruptions (e.g., weeds, missing crops, etc.).

In an example, the end condition for the evaluations is a period. Here, the phase of the filter is shifted until it again aligns with its-if. In an example, each position of each shift is added to the set of positions with a weight based on the evaluation. Thus, a maximum position would have the highest weight and a minimum position the lowest weight. These weights can be used in the line fitting described below.

In an example, a second position is added to the set of positions. Here, the second position corresponds to the first position by a period used for the filter. In an example, the second position corresponds to a row of a type that is the same as a row of the position (e.g., they are both crop rows, or they are both furrows). These examples illustrate that the nature (e.g., structure) of the filter permits other crop related row points to be found based on the period. Thus, if a first top of a wave is centered on a crop row, then the subsequent wave tops are also on centered on other crop rows. Not only is this computationally efficient, but is effective at dealing with noise, such as missing plants in a crop row, weeds in a furrow, etc.

In an example, a second position is added to the set of positions. Here, the second position corresponds to the first position by a half-period of a period used for the filter. In an example, the second position corresponds to a row of a type that is different than a row of the position (e.g., one is a crop row and one is a furrow). Again, the advantage of the filter includes the ability to quickly ascertain not only other similar row types, but also the alternative row types. This is possible because crop rows and furrows are generally precisely distanced in way that is effectively modeled by the filter.

In an example, to shift the filter across respective segments of the set of image segments to get the set of positions, the processing circuitry 110 is arranged to transform the filter and the respective segments of the set of image segments to corresponding representations (e.g., corresponding frequency spectrums) in the frequency domain, such as by using a Discrete Fourier Transform (DFT). The processing circuitry 110 is further configured to multiply frequencies of the frequency domain representation of the filter with frequencies of the frequency domain representation of the respective data segments of the set of image segments. The result of such multiplication can then be transformed back to the space domain (e.g., by using an inverse DFT), scanned or evaluated to determine an extremum, weighted, and added to a set of positions, such as previously described.

In an example, the filter is a function whose frequency spectrum has a single frequency, such as a sine function. In such example, to shift the filter across respective segments of the set of image segments to get the set of positions, the processing circuitry 110 is arranged to transform the respective segments of the set of segments to corresponding frequency spectrums in the frequency domain, and, for each frequency spectrum, select a frequency response that corresponds to a frequency of the filter as the extrema. The location of the extrema can be calculated using an arctangent of a ratio of the imaginary component of the frequency response to the real component. Such location can be added to a set of positions, as described herein.

In another example, the filter is a function whose, frequency spectrum has a single frequency, such as a sine function. In such example, to shift the filter across respective segments of the set of image segments to get the set of positions, the processing circuitry 110 is arranged to evaluate the filter at a first position, such as by multiplying elements of the filter with corresponding elements of a respective segment and summing the result to produce a first value. The processing circuitry 110 is further arranged to evaluate the filter at a second position that is orthogonal to, or phase shifted 90 degrees from, the first position, to produce a second value. The location of the extrema can be calculated using an arctangent of a ratio of the first value to the second value. Such location can be added to a set of positions, as described herein.

The processing circuitry 110 is arranged to fit a line to members of the set of positions. In an example, fitting the line to members of the set of positions includes applying at least one of a linear regression or RANSAC technique to the members. This line fitting operation addresses noise in the original positions for a given crop related row. Moreover, because there are relatively few points, an accurate line for a center of a crop related row involves far fewer processing operations than is available in traditional row discovery techniques. In an example, the line can be shifted to represent an edge of a crop row. Here, given a known width of a crop (e.g., corn, soybeans, etc.), the centered line can be shifted by one half the known width to represent the edge.

The processing circuitry 110 is arranged to communicate the calculated line to a receiver. Generally, a steering controller of the AEQ 125 is the receiver, however, an intermediary can also be the receiver where the intermediary uses the line to calculate the TKE and XTK values for the steering controller. In an example, the processing circuitry 110 is itself the receiver to also process some or all of the TKE or XTK. Communicating the line can include placing the line in a data structure in the memory 115 or transmitting a representation of the line over an interlink (e.g., bus, network, etc.).

FIGS. 2A-2B illustrate various components and relationships of an AEQ in an operating environment, according to an embodiment. FIG. 2A is a top-down view of an AEQ 210 in a field. The shaded portions represent crop rows 215 and the space between the crop rows 215 are furrows 220. The AEQ 210 includes a sensor 205 mounted to the front side of the AEQ 210. Here, the AEQ 210 is not aligned with the crop rows 215 or furrows 220 but deviates by TKE 225. A steering controller of the AEQ 210 is arranged to steer the AEQ 210 to be in line with the crop rows 215 with wheels in the furrows 220.

FIG. 2B illustrated a side view of the AEQ 210 with the front mounted sensor 205. The height 235 of the sensor 205 and the angle to the ground 230 are calibration parameters for the CV system. These parameters can be provided by a user or can be auto-calibrated. Auto-calibration can take several forms, such as using a rang-finder (e.g., ultrasonic, radar, laser, etc.), or can use the filter fitting described herein. In the latter case, given a crop type, for example, different periods can be tested at a given segment to ascertain which period results in a maximum value. The given period is then used as an index to the height 235 or angle 230 calibration parameter.

FIGS. 3A-3B illustrate fitting a filter to crop rows, according to an embodiment. FIG. 3A is an unsegmented image illustrating the fitting of a single filter with a first period 310 and a second period 315 to the crop rows 305. Note that the period 310 is smaller than period 315, reflecting their relative positions in the image and a known compression of the crop row spacing due to the sensor optics.

FIG. 3B illustrates the segmentation of the image of 3A. Specifically, FIG. 3B illustrates a first segment 320 taken towards the top of the image, and a second segment 325 taken closer to the bottom of the image. Because it is known from whence the segment was taken from the image, the correct period (e.g., period 310 for segment 320 and period 315 for segment 325) can be used. This reduces the convolution of the filter to a single period for any given segment (e.g., different periods do not need to be tested for a given segment).

Figure 4:
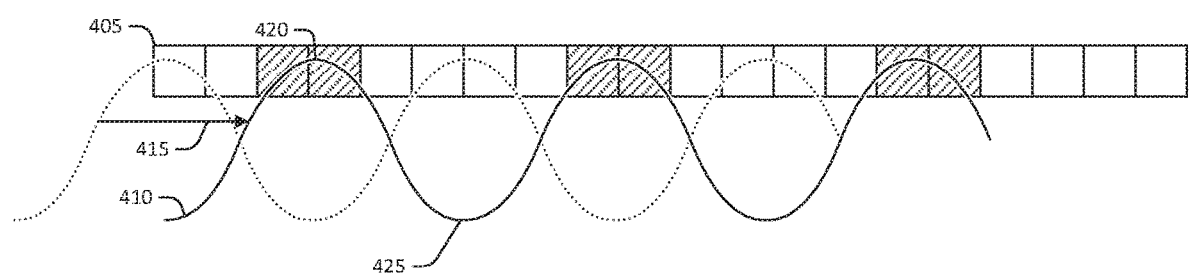
FIG. 4 illustrates a convolutional fitting of a filter to a segment of an image, according to an embodiment.

FIG. 4 illustrates a convolutional fitting of a filter to a segment of an image, according to an embodiment. In the illustrated example, the segment 405 is a scanline (e.g., horizontal row of pixels), where white pixels represent furrows and shaded pixels represent crop rows. The filter 410 started in the position represented by the dots and was iteratively moved 415 to its current position. Here, the maxima 420 corresponds to the first center of the crop row pixels and the minimum corresponds to the first center of furrow pixels. Not that the other extremum of the filter 410 can be used as respective centers for crop rows and furrows.

The illustration also highlights possible processing techniques. For example, the filter can be represented as a pixel window, with each pixel in the window being multiplied by a value based on its position (e.g., the first pixel is multiple by 10, the second by 8, the third by 2, etc.) to represent the period. The scanline can then be shifted by one pixel (e.g., the first pixel is discarded, all other pixels are shifted, and a new pixel is added in the last position) and the calculation re-run. It is also possible to model several of these shifts and provide a different starting point in the scanline to different pipelines in a SIMD processor, effectively processing several shifts in parallel.

Figure 5:
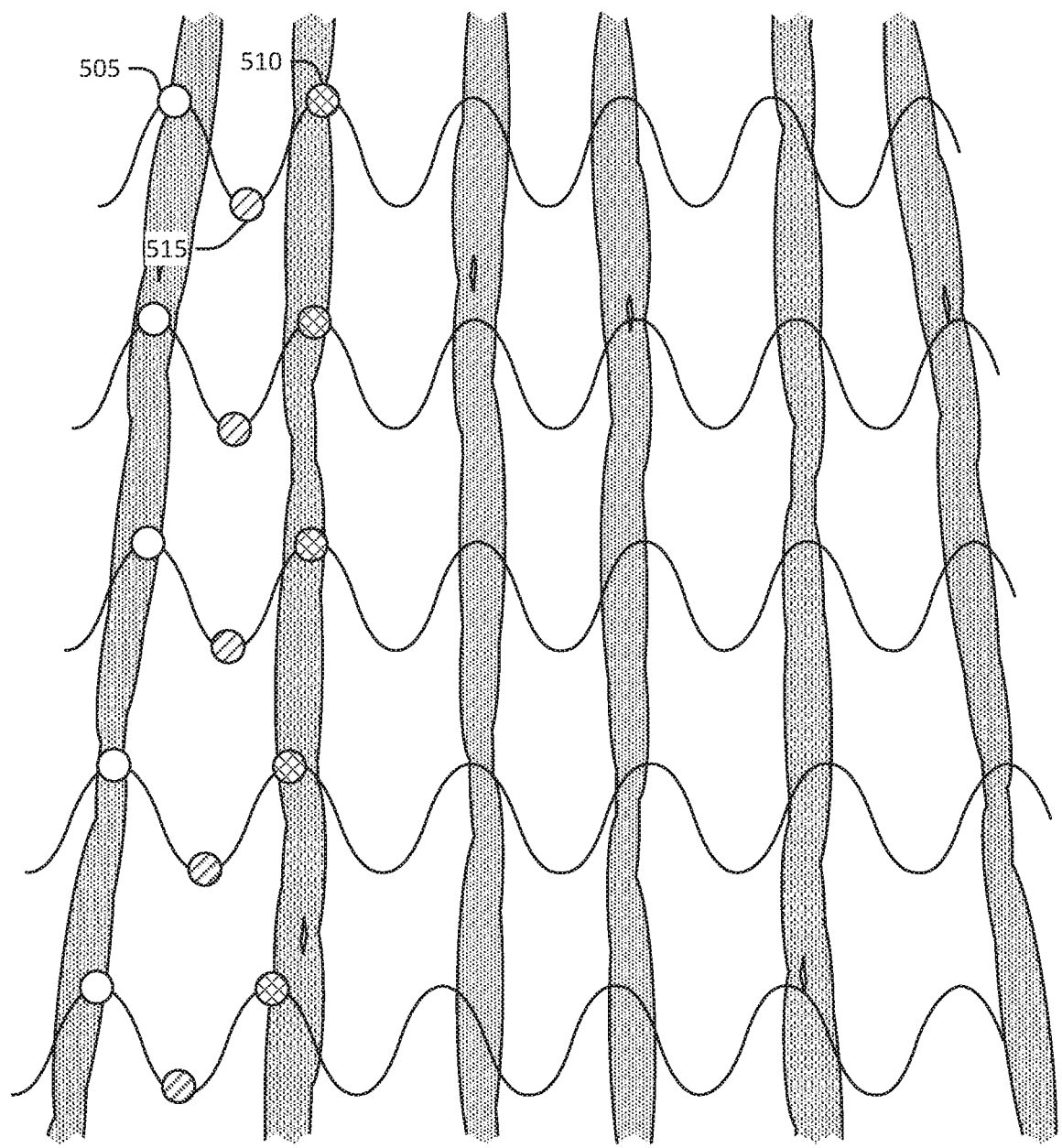
FIG. 5 illustrates a set of positions resulting from fitting a filter to crop related rows, according to an embodiment.

FIG. 5 illustrates a set of positions resulting from fitting a filter to crop related rows, according to an embodiment. As illustrated, the blank positions 505 are determined by fitting the filter to the crop rows. The cross-shaded positions 510 are calculated directly from the positions 505 and a multiple of the period of the filter. The shaded positions 515 are similarly calculated directly from the positions 505, however a half-period multiple is used. When line-fitting to find a crop related row center, the positions are grouped to correspond to one crop related row. Thus, positions 505 are grouped and a line fit to them, or positions 515 are grouped, or positions 510 are grouped. The grouping can be accomplished in several ways, including, for example, by position with respect to the segment processing. Thus, a first position (e.g., measured from the left of the image) in a segment is tagged as the first position (e.g., via a label, put into a first position in an array, etc.). Once the segments are done being processed, all the first positions are grouped, the second positions are grouped, etc.

Figure 6:
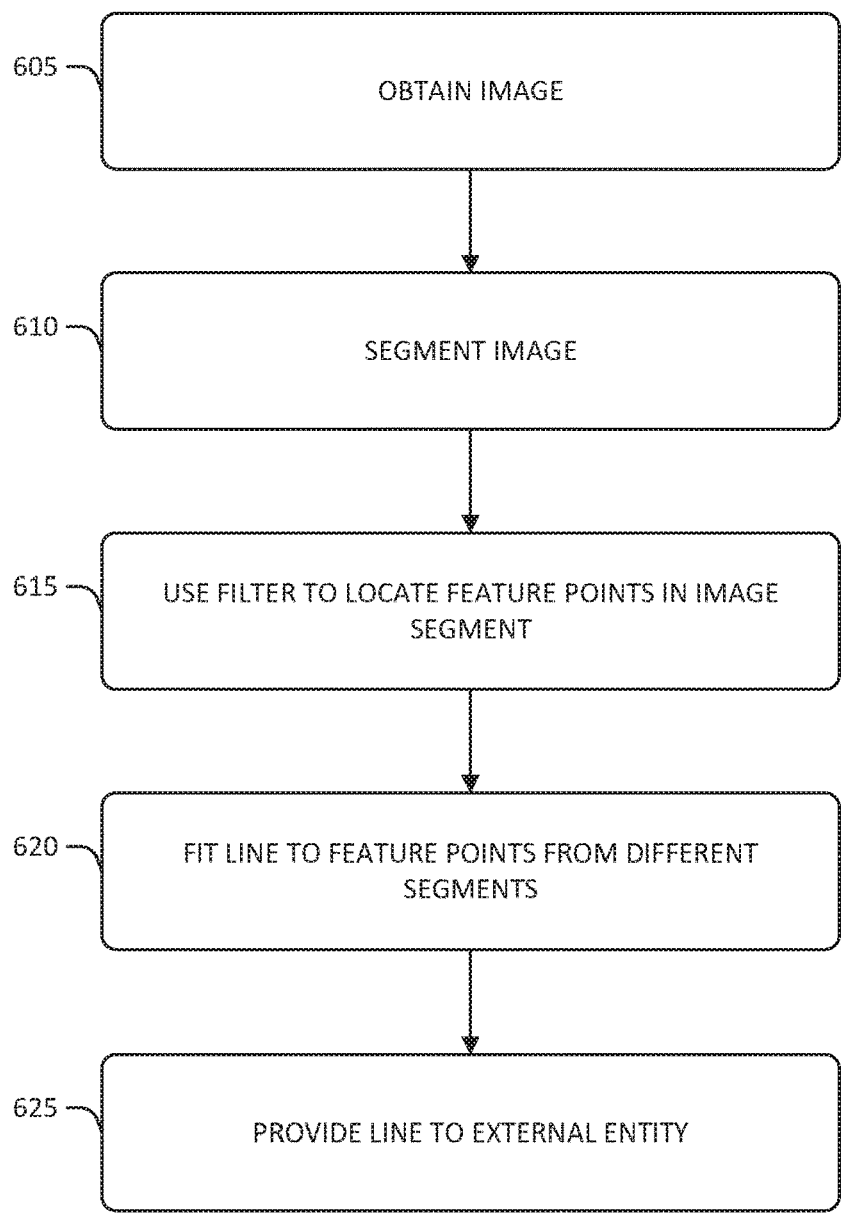
FIG. 6 illustrates a flow diagram of an example of a method for detecting a crop related row from an image, according to an embodiment.

FIG. 6 illustrates a flow diagram of an example of a method 600 for detecting a crop related row from an image, according to an embodiment. The operations of the method 600 are performed on hardware, such as that described above or below (e.g., processing circuitry).

At operation 605, an image that includes several rows is obtained (e.g., retrieved or received). Here, the several rows are crop related rows that include both crop rows and furrows. In an example, the image is an intensity image. In an example, the intensity image is implemented as a grayscale image. In an example, a crop row is lighter than a furrow.

At operation 610, the image is segmented to produce a set of image segments. In an example, segments in the set of image segments are scanlines of the image. Other example segments can include partial scanlines, multiple scanlines, a sampling of scanlines (e.g., not all scanlines), etc. Generally, each segment will include multiple crop related rows of one type (e.g., two or more furrows).

At operation 615, a filter is shifted across respective segments of the set of image segments to get a set of positions. Here, the set of positions are based on the filters, such as the tops or bottoms of a sine wave. In an example, shifting the filter across respective segments includes shifting the filter across several segments in parallel.

In an example, shifting the filter across respective segments includes using a first period on a first segment and a second period on a second segment. In an example, the first period and the second period are respectively selected based on a respective position of the first segment and the second segment in the image. In an example, the first period and the second period are based on a calibration parameter. In an example, the calibration parameter is derived from a user selection.

In an example, shifting the filter across respective segments of the set of image segments to get a set of positions includes evaluating the filter at a series of positions, starting from a first position, until an extremum is found. A position corresponding to the extremum is then added to the set of positions. In an example, the extremum is a maximum. In an example, a second position is added to the set of positions. Here, the second position corresponds to the first position by a period used for the filter. In an example, the second position corresponds to a row of a type that is the same as a row of the position (e.g., they are both crop rows, or they are both furrows).

In an example, a second position is added to the set of positions. Here, the second position corresponds to the first position by a half-period of a period used for the filter. In an example, the second position corresponds to a row of a type that is different than a row of the position (e.g., one is a crop row and one is a furrow).

At operation 620, a line is fit to members of the set of positions. In an example, fitting the line to members of the set of positions includes applying at least one of a linear regression or RANSAC technique to the members.

At operation 625, the line calculated at operation 620 is communicated to a receiver.

The following implementation of the systems and techniques described above provides an example assemblage of those techniques. In this example, input of the component is an intensity map (e.g., image) resulting from a digital camera. In an example, the intensity map is a disparity or depth map resulting from a stereo camera pair or a time of flight camera. In an example, for a mono Camera, the intensity map can be produce from a multi-channel color space (e.g., RGB, YUV, etc.) that is converted into a single channel (e.g., grayscale).

This example uses the convolution operation and line-fitting operations. Here, the convolution searches for a 'best fitting position' of a model (or filter) on a scanline by scanline basis. The operation can be repeated for each scanline, several scanlines, clusters of successive scanlines (e.g., added, averaged, etc.), among other groupings. Assuming a scanline by scanline one-dimensional operation, the model is created first. Here, the model is a repetitive signal (e.g., sine wave, triangle wave, etc.) of which the wavelength approximates the wavelength of successive crop rows at the scanline of the image being processed.

Second, the scanline data is obtained from the image. The point of the convolution is to save the position at which the convolution reaches an extremum. The selected data from the scanline is taken relative to a pre-determined position, for example the center of the image. The convolution is processed until the extremum is found. Positions at which the convolution reaches extrema (e.g., a maximum and a minimum) are saved. These represent the positions at the scanline where the model best fits and worst fits the image data.

Third, the convolution is repeated for each scanline. Here, the convolution results in two sets of points (one for the maximum and one for the minimum). In an example, these sets can be combined into a single set by a modulo (e.g., dividing by the half-wavelength and keeping the remainder) operation per scanline. The result are points that can be used to detect straight line patterns reflecting crop related rows.

Fourth, a line is fit to the sets of points. Any line fitting technique can be used. Examples can include linear regression and RANSAC.

The systems and techniques described herein combine robustness (e.g., resistance to noise) and efficiency for accurate crop related row detection. It is robust because the convolution product can scan multiple crop rows per scanline, incorporating all image information per scanline into each convolution result, which is robust to local disturbances in the image (e.g., weeds, lack of crop, etc.). Also, the line fitting can further reduce noise in the convolution generated point sets.

The techniques are efficient because each pixel—e.g., within the desired region of interest defined by the number of crop rows—is processed only once. Further, the scanline per scanline approach enables a pipelined process enabling, for example, scanlines to be processed while the image data is acquired line by line from the image sensor. This enables fast and efficient processing.

Figure 7:
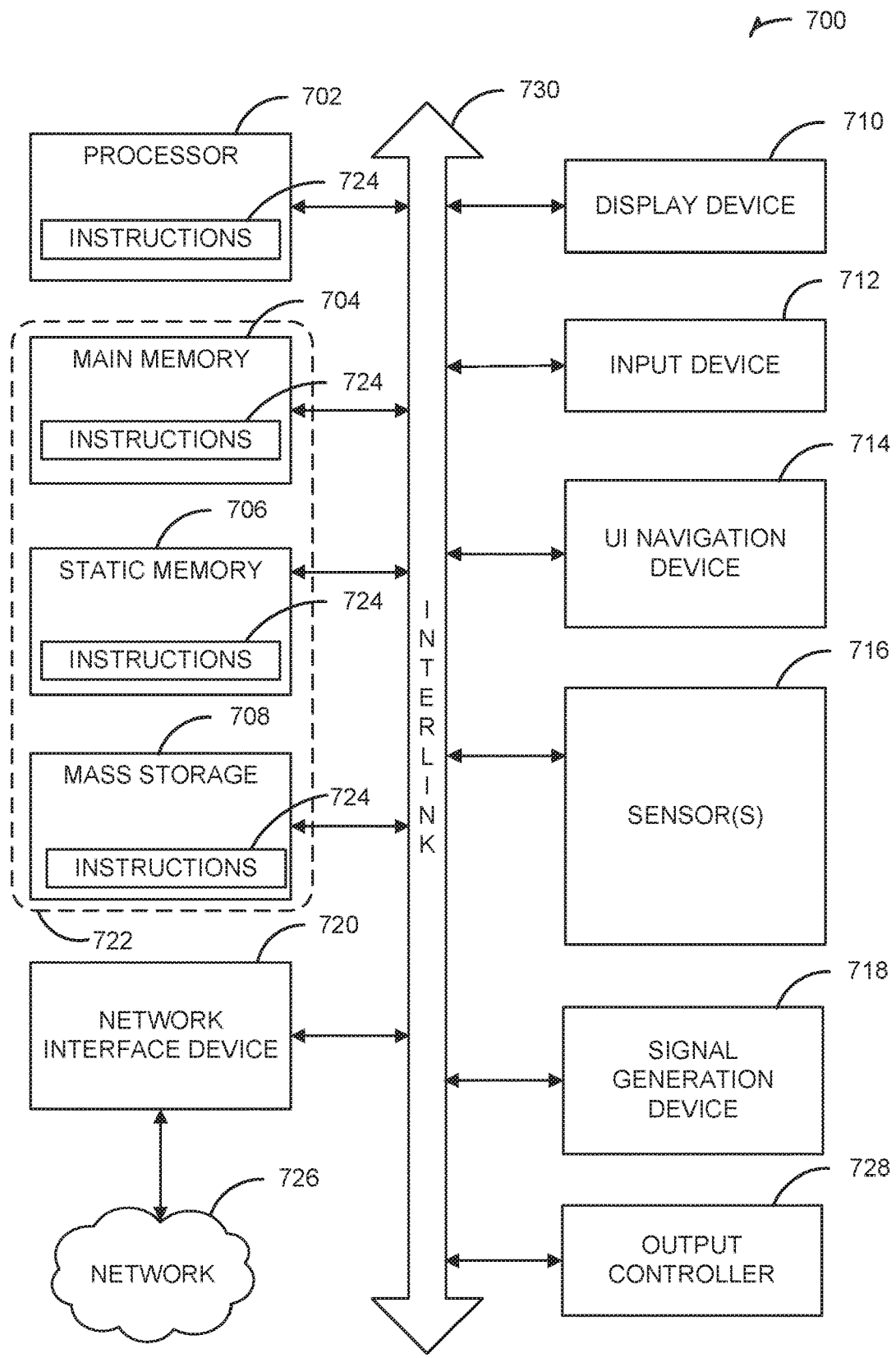
FIG. 7 is a block diagram illustrating an example of a machine upon which one or more embodiments can be implemented.

FIG. 7 illustrates a block diagram of an example machine 700 upon which any one or more of the techniques (e.g., methodologies) discussed herein can perform. Examples, as described herein, can include, or can operate by, logic or a number of components, or mechanisms in the machine 700. Circuitry (e.g., processing circuitry) is a collection of circuits implemented in tangible entities of the machine 700 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 700 follow.

In alternative embodiments, the machine 700 can operate as a standalone device or can be connected (e.g., networked) to other machines. In a networked deployment, the machine 700 can operate in the capacity of a server machine, a client machine, or both in server-client network environments. In an example, the machine 700 can act as a peer machine in peer-to-peer (P2P) (or other distributed) network environment. The machine 700 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 700 can include a hardware processor 702 (e.g., a central processing unit (CPU), a graphics processing unit (GPU), a hardware processor core, or any combination thereof), a main memory 704, a static memory (e.g., memory or storage for firmware, microcode, a basic-input-output (BIOS), unified extensible firmware interface (UEFI), etc.) 706, and mass storage 708 (e.g., hard drive, tape drive, flash storage, or other block devices) some or all of which can communicate with each other via an interlink (e.g., bus) 730. The machine 700 can further include a display unit 710, an alphanumeric input device 712 (e.g., a keyboard), and a user interface (UI) navigation device 714 (e.g., a mouse). In an example, the display unit 710, input device 712 and UI navigation device 714 can be a touch screen display. The machine 700 can additionally include a storage device (e.g., drive unit) 708, a signal generation device 718 (e.g., a speaker), a network interface device 720, and one or more sensors 716, such as a global positioning system (UPS) sensor, compass, accelerometer, or other sensor. The machine 700 can include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 702, the main memory 704, the static memory 706, or the mass storage 708 can be, or include, a machine readable medium 722 on which is stored one or more sets of data structures or instructions 724 (e.g., software) embodying or utilized by any one or more of the techniques or functions described herein. The instructions 724 can also reside, completely or at least partially, within any of registers of the processor 702, the main memory 704, the static memory 706, or the mass storage 708 during execution thereof by the machine 700. In an example, one or any combination of the hardware processor 702, the main memory 704, the static memory 706, or the mass storage 708 can constitute the machine readable media 722. While the machine readable medium 722 is illustrated as a single medium, the term "machine readable medium" can include a single medium or multiple media (e.g., a centralized or distributed database, and/or associated caches and servers) configured to store the one or more instructions 724.

The term "machine readable medium" can include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples can include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 can be further transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 can include one or more physical jacks (e.g., Ethernet, coaxial, or phone jacks) or one or more antennas to connect to the communications network 726. In an example, the network interface device 720 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software. A transmission medium is a machine readable medium.

ADDITIONAL NOTES & EXAMPLES

Example 1 is a device for detecting a crop related row from image, the device comprising: a memory including instructions; and processing circuitry that is configured by the instructions to: obtain an image that includes several rows, the several rows including crop rows and furrows; segment the image to produce a set of image segments; shift a filter across respective segments of the set of image segments to get a set of positions; fit a line to members of the set of positions; and communicate the line to a receiver.

In Example 2, the subject matter of Example 1, wherein the image is an intensity image.

In Example 3, the subject matter of Example 2, wherein the intensity image is implemented as a grayscale image.

In Example 4, the subject matter of Example 3, wherein a crop row is lighter than a furrow.

In Example 5, the subject matter of any of Examples 1-4, wherein segments in the set of image segments are scanlines of the image.

In Example 6, the subject matter of any of Examples 1-5, wherein, to shift the filter across respective segments, the processing circuitry is configured by the instructions to shift the filter across several segments in parallel.

In Example 7, the subject matter of any of Examples 1-6, wherein, to shift the filter across respective segments, the processing circuitry is configured by the instructions to use a first period on a first segment and a second period on a second segment.

In Example 8, the subject matter of Example 7, wherein the first period and the second period are respectively selected based on a respective position of the first segment and the second segment in the image.

In Example 9, the subject matter of Example 8, wherein the first period and the second period are based on a calibration parameter.

In Example 10, the subject matter of Example 9, wherein the calibration parameter is derived from a user selection.

In Example 11, the subject matter of any of Examples 1-10, wherein, to shift the filter across respective segments of the set of image segments to get the set of positions, the processing circuitry is configured by the instructions to: evaluate the filter at a series of positions, starting from a first position, until an extremum is found; and add a position corresponding to the extremum to the set of positions.

In Example 12, the subject matter of Example 11, wherein the extremum is a maximum.

In Example 13, the subject matter of any of Examples 11-12, wherein a second position is added to the set of positions, the second position corresponding to the first position by a period used for the filter.

In Example 14, the subject matter of Example 13, wherein the second position corresponds to a row of a type that is the same as a row of the position.

In Example 15, the subject matter of any of Examples 11-14, wherein a second position is added to the set of positions, the second position corresponding to the first position by a half-period of a period used for the filter.

In Example 16, the subject matter of Example 15, wherein the second position corresponds to a row of a type that is different than a row of the position.

In Example 17, the subject matter of any of Examples 1-16, wherein, to fit the line to members of the set of positions, the processing circuitry is configured by the instructions to apply at least one of a linear regression or random sample consensus (RANSAC) to the members.

Example 18 is a method for detecting a crop related row from image, the method comprising: obtaining an image that includes several rows, the several rows including crop rows and furrows; segmenting the image to produce a set of image segments; shifting a filter across respective segments of the set of image segments to get a set of positions; fitting a line to members of the set of positions; and communicating the line to a receiver.

In Example 19, the subject matter of Example 18, wherein the image is an intensity image.

In Example 20, the subject matter of Example 19, wherein the intensity image is implemented as a grayscale image.

In Example 21, the subject matter of Example 20, wherein a crop row is lighter than a furrow.

In Example 22, the subject matter of any of Examples 18-21, wherein segments in the set of image segments are scanlines of the image.

In Example 23, the subject matter of any of Examples 18-22, wherein shifting the filter across respective segments includes shifting the filter across several segments in parallel.

In Example 24, the subject matter of any of Examples 18-23, wherein shifting the filter across respective segments includes using a first period on a first segment and a second period on a second segment.

In Example 25, the subject matter of Example 24, wherein the first period and the second period are respectively selected based on a respective position of the first segment and the second segment in the image.

In Example 26, the subject matter of Example 25, wherein the first period and the second period are based on a calibration parameter.

In Example 27, the subject matter of Example 26, wherein the calibration parameter is derived from a user selection.

In Example 28, the subject matter of any of Examples 18-27, wherein shifting the filter across respective segments of the set of image segments to get the set of positions includes: evaluating the filter at a series of positions, starting from a first position, until an extremum is found; and adding a position corresponding to the extremum to the set of positions.

In Example 29, the subject matter of Example 28, wherein the extremum is a maximum.

In Example 30, the subject matter of any of Examples 28-29, wherein a second position is added to the set of positions, the second position corresponding to the first position by a period used for the filter.

In Example 31, the subject matter of Example 30, wherein the second position corresponds to a row of a type that is the same as a row of the position.

In Example 32, the subject matter of any of Examples 28-31, wherein a second position is added to the set of positions, the second position corresponding to the first position by a half-period of a period used for the filter.

In Example 33, the subject matter of Example 32, wherein the second position corresponds to a row of a type that is different than a row of the position.

In Example 34, the subject matter of any of Examples 18-33, wherein fitting the line to members of the set of positions includes applying at least one of a linear regression or random sample consensus (RANSAC) to the members.

Example 35 is a machine readable medium including instructions for detecting a crop related row from image, the instructions, when executed by processing circuitry, cause the processing circuitry to perform operations comprising: obtaining an image that includes several rows, the several rows including crop rows and furrows; segmenting the image to produce a set of image segments; shifting a filter across respective segments of the set of image segments to get a set of positions; fitting a line to members of the set of positions; and communicating the line to a receiver.

In Example 36, the subject matter of Example 35, wherein the image is an intensity image.

In Example 37, the subject matter of Example 36, wherein the intensity image is implemented as a grayscale image.

In Example 38, the subject matter of Example 37, wherein a crop row is lighter than a furrow.

In Example 39, the subject matter of any of Examples 35-38, wherein segments in the set of image segments are scanlines of the image.

In Example 40, the subject matter of any of Examples 35-39, wherein shifting the filter across respective segments includes shifting the filter across several segments in parallel.

In Example 41, the subject matter of any of Examples 35-40, wherein shifting the filter across respective segments includes using a first period on a first segment and a second period on a second segment.

In Example 42, the subject matter of Example 41, wherein the first period and the second period are respectively selected based on a respective position of the first segment and the second segment in the image.

In Example 43, the subject matter of Example 42, wherein the first period and the second period are based on a calibration parameter.

In Example 44, the subject matter of Example 43, wherein the calibration parameter is derived from a user selection.

In Example 45, the subject matter of any of Examples 35-44, wherein shifting the filter across respective segments of the set of image segments to get the set of positions includes: evaluating the filter at a series of positions, starting from a first position, until an extremum is found; and adding a position corresponding to the extremum to the set of positions.

In Example 46, the subject matter of Example 45, wherein the extremum is a maximum.

In Example 47, the subject matter of any of Examples 45-46, wherein a second position is added to the set of positions, the second position corresponding to the first position by a period used for the filter.

In Example 48, the subject matter of Example 47, wherein the second position corresponds to a row of a type that is the same as a row of the position.

In Example 49, the subject matter of any of Examples 45-48, wherein a second position is added to the set of positions, the second position corresponding to the first position by a half-period of a period used for the filter.

In Example 50, the subject matter of Example 49, wherein the second position corresponds to a row of a type that is different than a row of the position.

In Example 51, the subject matter of any of Examples 35-50, wherein fitting the line to members of the set of positions includes applying at least one of a linear regression or random sample consensus (RANSAC) to the members.

Example 52 is a system for detecting a crop related row from image, the system comprising: means for obtaining an image that includes several rows, the several rows including crop rows and furrows; means for segmenting the image to produce a set of image segments; means for shifting a filter across respective segments of the set of image segments to get a set of positions; means for fitting a line to members of the set of positions; and means for communicating the line to a receiver.

In Example 53, the subject matter of Example 52, wherein the image is an intensity image.

In Example 54, the subject matter of Example 53, wherein the intensity image is implemented as a grayscale image.

In Example 55, the subject matter of Example 54, wherein a crop row is lighter than a furrow.

In Example 56, the subject matter of any of Examples 52-55, wherein segments in the set of image segments are scanlines of the image.

In Example 57, the subject matter of any of Examples 52-56, wherein the means for shifting the filter across respective segments include means for shifting the filter across several segments in parallel.

In Example 58, the subject matter of any of Examples 52-57, wherein the means for shifting the filter across respective segments include means for using a first period on a first segment and a second period on a second segment.

In Example 59, the subject matter of Example 58, wherein the first period and the second period are respectively selected based on a respective position of the first segment and the second segment in the image.

In Example 60, the subject matter of Example 59, wherein the first period and the second period are based on a calibration parameter.

In Example 61, the subject matter of Example 60, wherein the calibration parameter is derived from a user selection.

In Example 62, the subject matter of any of Examples 52-61, wherein the means for shifting the filter across respective segments of the set of image segments to get the set of positions include: means for evaluating the filter at a series of positions, starting from a first position, until an extremum is found; and means for adding a position corresponding to the extremum to the set of positions.

In Example 63, the subject matter of Example 62, wherein the extremum is a maximum.

In Example 64, the subject matter of any of Examples 62-63, wherein a second position is added to the set of positions, the second position corresponding to the first position by a period used for the filter.

In Example 65, the subject matter of Example 64, wherein the second position corresponds to a row of a type that is the same as a row of the position.

In Example 66, the subject matter of any of Examples 62-65, wherein a second position is added to the set of positions, the second position corresponding to the first position by a half-period of a period used for the filter.

In Example 67, the subject matter of Example 66, wherein the second position corresponds to a row of a type that is different than a row of the position.

In Example 68, the subject matter of any of Examples 52-67, wherein the means for fitting the line to members of the set of positions include means for applying at least one of a linear regression or random sample consensus (RANSAC) to the members.

Example 69 is at least one machine-readable medium including instructions that, when executed by processing circuitry, cause the processing circuitry to perform operations to implement of any of Examples 1-68.

Example 70 is an apparatus comprising means to implement of any of Examples 1-68.

Example 71 is a system to implement of any of Examples 1-68.

Example 72 is a method to implement of any of Examples 1-68.

The above detailed description includes references to the accompanying drawings, which form a part of the detailed description. The drawings show, by way of illustration, specific embodiments that can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A device for detecting a crop related row from image, the device comprising
   a memory including instructions; and
   processing circuitry that is configured by the instructions to:
   obtain an image that includes two or more rows, the two or more rows including crop rows and furrows;
   segment the image to produce a set of two or more image segments;
   determine, for each image segment, a period of a periodic function corresponding to the two or more rows based on a position of the segment in the image;
   obtain, for each segment, a filter based on the corresponding periodic function and determined period;
   shift each the filter across respective segments of the set of two or more image segments to get a set of positions;
   fit a line to members of the set of positions; and
   communicate the line to a receiver.

2. The device of claim 1, wherein the image is an intensity image.

3. The device of claim 2, wherein the intensity image is implemented as a grayscale image.

4. The device of claim 3, wherein a crop row is lighter than a furrow.

5. The device of claim 1, wherein segments in the set of image segments are scanlines of the image.

6. The device of claim 1, wherein, to shift each filter across respective segments, the processing circuitry is configured by the instructions to shift each filter across several segments in parallel.

7. The device of claim 1, wherein, to shift each filter across respective segments, the processing circuitry is configured by the instructions to use a first period on a first segment and a second period on a second segment.

8. The device of claim 7, wherein the first period and the second period are respectively selected based on a respective position of the first segment and the second segment in the image.

9. The device of claim 8, wherein the first period and the second period are based on a calibration parameter.

10. The device of claim 1, wherein, to shift each filter across respective segments of the set of image segments to get the set of positions, the processing circuitry is configured by the instructions to:
    evaluate each filter at a series of positions, starting from a first position, until an extremum is found; and
    add a position corresponding to the extremum to the set of positions.

11. The device of claim 10, wherein a second position is added to the set of positions, the second position corresponding to the first position by a period of the respective filter.

12. The device of claim 11, wherein the second position corresponds to a row of a type that is the same as a row of the position.

13. The device of claim 10, wherein a second position is added to the set of positions, the second position corresponding to the first position by a half-period of a period of the respective filter.

14. The device of claim 13, wherein the second position corresponds to a row of a type that is different than a row of the position.

15. The device of claim 1, wherein, to fit the line to members of the set of positions, the processing circuitry is configured by the instructions to apply at least one of a linear regression or random sample consensus (RANSAC) to the members.

16. A method for detecting a crop related row from image based on random sample consensus (RANSAC) line-fitting, the method comprising:
    obtaining an image that includes several rows, the several rows including crop rows and furrows;
    segmenting the image to produce a set of image segments;
    shifting a periodic filter across respective segments of the set of image segments to get a detected set of positions;
    obtaining a line that is indicative of a position of the crop related row using the detected set of positions and RANSAC line-fitting; and
    communicating the line to a receiver.

17. The method of claim 16, wherein the image is an intensity image.

18. The method of claim 16, wherein segments in the set of image segments are scanlines of the image.

19. The method of claim 16, wherein shifting the periodic filter across respective segments of the set of image segments to get the detected set of positions includes:
    evaluating the periodic filter at a series of positions, starting from a first position, until an extremum is found; and
    adding a position corresponding to the extremum to the detected set of positions.

20. The method of claim 19, wherein shifting a filter across respective segments of the set of image segments to get the set of positions includes:
    evaluating the periodic filter at a series of positions to obtain a first set of positions corresponding to a first extremum and a second set of positions corresponding to a second extremum, the first extremum being indicative of crop row positions and the second extremum being indicative of furrow positions; and
    combining the first set of positions and the second set of positions to obtain the detected set of positions.

* * * * *